United States Patent [19]

Suzuki

[11] Patent Number: 4,459,874
[45] Date of Patent: Jul. 17, 1984

[54] TRANSAXLE MECHANISM OF FOUR-WHEEL VEHICLE DRIVE SYSTEM

[75] Inventor: Kunihiko Suzuki, Yokohama, Japan

[73] Assignee: Nissan Motor Company, Limited, Yokohama, Japan

[21] Appl. No.: 372,447

[22] Filed: Apr. 27, 1982

[30] Foreign Application Priority Data

Jul. 15, 1981 [JP] Japan .................................. 56-110436

[51] Int. Cl.³ .............................................. F16H 3/02
[52] U.S. Cl. ................................................. 74/745
[58] Field of Search .................. 74/701, 740, 745, 850

[56] References Cited

U.S. PATENT DOCUMENTS

| 4,224,839 | 9/1980 | Kaler | 74/745 X |
| 4,326,597 | 4/1982 | Murayama et al. | 74/745 X |
| 4,417,642 | 11/1983 | Suzuki et al. | 74/682 X |

FOREIGN PATENT DOCUMENTS

| 887849 | 1/1962 | United Kingdom . |
| 2064449 | 6/1981 | United Kingdom . |
| 2074517 | 11/1981 | United Kingdom . |

Primary Examiner—Leslie A. Braun
Assistant Examiner—Frank McKenzie
Attorney, Agent, or Firm—Lane, Aitken & Kananen

[57] ABSTRACT

A transaxle mechanism of a four-wheel drive system for a vehicle including an engine having an output shaft having an axis of rotation laterally of the vehicle, comprising a transmission gear unit including input and output shafts each having an axis of rotation parallel with the axis of rotation of the engine output shaft, a drive gear rotatable about an axis parallel with the transmission input and output shafts and driven by the transmission output shaft, a first wheel drive gear unit comprising power splitting gear means to split driving power from the drive gear into two power components and a differential gear assembly to transmit one power component to a pair of road wheels, a second wheel drive gear unit comprising right-angle power transfer gear means engageable with the power splitting gear means and adapted to transmit the other driving power component in a fore-and-aft direction of the vehicle, the power splitting gear means constituting low-and-high speed shifting gear means to transfer driving power from the drive gear to the differential gear assembly selectively with two different gear ratios, and a driveline intervening between the power transfer gear means and another pair of road wheels and adapted to be driven by the driving power component transmitted through the transfer gear means.

8 Claims, 1 Drawing Figure

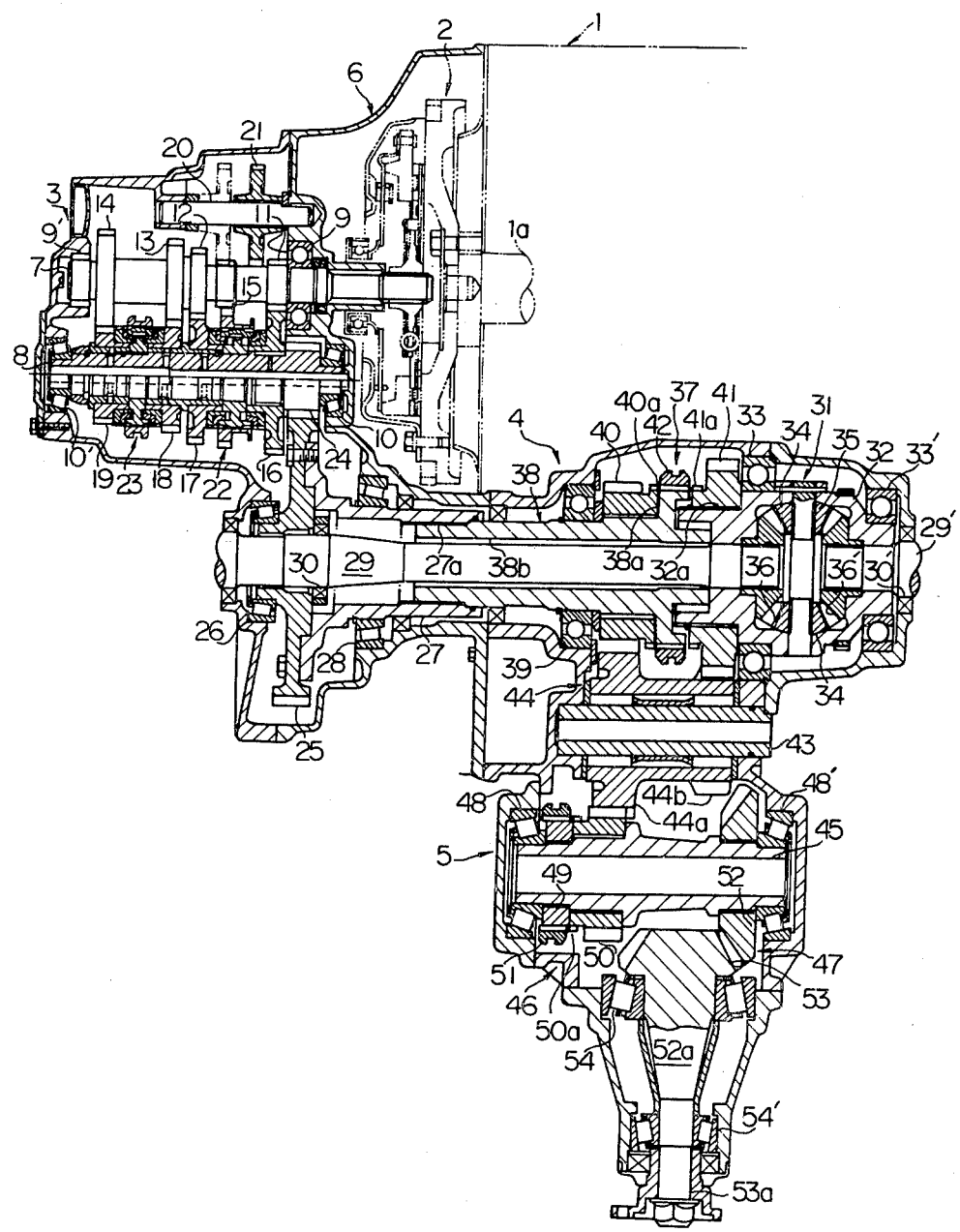

TRANSAXLE MECHANISM OF FOUR-WHEEL VEHICLE DRIVE SYSTEM

FIELD OF THE INVENTION

The present invention relates to a four-wheel drive system for an automotive vehicle having at least two pairs of road wheels consisting of a pair of front road wheels and a pair of rear road wheels and, more particularly, to a transaxle mechanism for use in a four-wheel drive system for such a wheeled vehicle.

SUMMARY OF THE INVENTION

In accordance with the present invention, there is provided a transaxle mechanism for use in a four-wheel drive system for a vehicle having at least first and second pairs of road wheels, comprising a power unit having an output shaft rotatable about an axis in a lateral direction of the vehicle; a power transmission gear unit including transmission input and output shafts each having an axis of rotation parallel with an extension of the axis of rotation of the output shaft of the power unit; an intermediate drive gear rotatable about an axis parallel with the respective axes of rotation of the transmission input and output shafts, the transmission output shaft being held in driving engagement with the drive gear; a first wheel drive gear unit comprising power splitting gear means operative to split driving power from the drive gear into two power components and a differential gear assembly operative to transmit one of the two power components to the above mentioned first pair of road wheels; a second wheel drive gear unit comprising right-angle power transfer gear means engageable with the aforesaid power splitting gear means and operative to transmit therethrough the other of the two driving power components in a fore-and-aft direction of the vehicle; the power splitting gear means operatively intervening between the intermediate drive gear and the second wheel drive gear unit and constituting low-and-high speed shifting gear means operative to transfer driving power from the intermediate drive gear to the differential gear assembly selectively with two different gear ratios therebetween; and a driveline intervening between the right-angle power transfer gear means and the above mentioned second pair of road wheels and adapted to be driven by the driving power component transmitted through the transfer gear means.

DESCRIPTION OF THE DRAWING

The features and advantages of a transaxle mechanism of a four-wheel drive system proposed by the present invention will be more clearly understood from the following description take in conjunction with the accompanying drawing in which the general constructions and arrangements of a preferred embodiment of a transaxle mechanism according to the present invention is shown in a sectional view.

DESCRIPTION OF THE PREFERRED EMBODIMENT

Referring to the drawing, a transaxle mechanism embodying the present invention is provided in combination with a power unit typically constituted by an internal combustion engine which is schematically indicated at 1 in the drawing. The internal combustion engine 1 has a power output shaft 1a which is constituted by, for example, the crankshaft of an ordinary internal combustion engine for automotive use. The transaxle mechanism proposed by the present invention is to be used in a vehicle having the engine positioned laterally of the vehicle body. The engine 1 herein shown is thus installed on the body structure (not shown) of a wheeled vehicle in such a manner that the output shaft 1a extends in a lateral direction of the vehicle body. The transaxle mechanism embodying the present invention is further assumed as being incorporated in an automotive vehicle of the front-engine design and, thus, the engine 1 is positioned in a front portion of the vehicle body. The transaxle mechanism for use in such a four-wheel drive system includes a clutch unit 2, and a power transmission gear unit 3. In the shown embodiment of the present invention, it is further assumed by way of example that the clutch unit 2 is of the mechanical friction-disc type and that the power transmission gear unit 3 is of the manually operated type. The transaxle mechanism embodying the present invention comprises, in addition to the transmission gear unit 3, a front-wheel drive gear unit 4 and a rear-wheel drive gear unit 5 which are enclosed together with the transmission gear unit 3 within a transaxle casing 6.

The power transmission gear unit 3 comprises input and output shafts 7 and 8. The input shaft 7 has opposite end portions respectively journaled in bearings 9 and 9' received in the transaxle casing 6 and extending in alignment with the axis of rotation of the engine output shaft 1a. The transmission output shaft 8 likewise has opposite end portions respectively journaled in bearings 10 and 10' received in the transaxle casing 6 and extending in parallel with the transmission input shaft 7. The transmission input shaft 7 is selectively coupled to and uncoupled from the engine output shaft 1a through the clutch unit 2. The transmission gear unit 3 is assumed to be of the four-forward-speed and one-reverse-speed type and thus comprises five input gears rotatable with the transmission input shaft 7 and consisting of first-speed to fourth-speed forward drive gears 11 to 14, and a reverse drive gear 15. On the other hand, the transmission output shaft 8 has mounted thereon four driven gears rotatable independently of one another on the shaft 8 and consisting of first-speed to fourth-speed driven gears 16 to 19. The driven gears 16 to 19 on the transmission output shaft 8 are held in mesh with the drive gears 11 to 14, respectively, on the transmission input shaft 7. The transmission gear unit 3 further comprises a reverse idler shaft 20 having a reverse idler gear 21 rotatable and axially movable on the shaft 20 into and out of an axial position held in mesh with the reverse drive gear 15 on the transmission input shaft 7 as indicated by phantom lines in the drawing. The reverse idler shaft 20 also extends in parallel with the transmission input shaft 7 and has opposite end portions secured to the transaxle casing 6.

The transmission gear unit 3 further comprises a first-second speed synchronizer clutch assembly 22 and a third-fourth speed synchronizer clutch assembly 23, each of which is rotatable with the transmission output shaft 8. The first-second speed synchronizer clutch assembly 22 is provided between the first-speed and second-speed driven gears 16 and 17 and is selectively engageable with these gears 16 and 17. Likewise, the third-fourth speed synchronizer clutch assembly 23 is provided between the third-speed and fourth-speed driven gears 18 and 19 and is selectively engageable with the gears 18 and 19. The transmission output shaft 8 has fixedly mounted thereon a transmission output gear 24 which is thus rotatable with the transmission output shaft 8.

The transaxle mechanism embodying the present invention further comprises an intermediate drive gear 25 intervening between the transmission gear unit 3 and the front-wheel drive gear unit 4. The intermediate drive gear 25 is held in mesh with the above mentioned transmission output gear 24 and is rotatable with respect to the transaxle casing 6 about an axis parallel with the axis of rotation of the transmission output shaft 8. The drive gear 25 has a boss portion journaled in a bearing 26 received in the transaxle casing 6.

The front-wheel drive gear unit 4 comprises a hollow shaft 27 securely connected to the intermediate drive gear 25 and axially extending in parallel with the axis of rotation of the drive gear 25. The hollow shaft 27 has an axial portion journaled in a bearing 28 received in the transaxle casing 6 and is accordingly rotatable with the driven drive gear 25 about the axis of rotation of the driven gear 25. The hollow shaft 27 has an internally serrated inner peripheral portion 27a adjacent its axial end opposite to the drive gear 25. The front-wheel drive gear unit 4 further comprises a pair of side gear shafts 29 and 29' having axially outer end portions journaled in bearings 30 and 30', respectively, which are received in the transaxle casing 6. The side gear shafts 29 and 29' have respective axes of rotation which are aligned and in part coincident with the axis of rotation of the intermediate drive gear 25 and which are thus parallel with the input and output shafts 7 and 8 of the transmission gear unit 3. The side gear shafts 29 and 29' axially extend in opposite directions laterally of the vehicle body from a front-wheel differential gear assembly 31. The differential gear assembly 31 comprises a gear casing 32 which is rotatable about an axis aligned with the axes of rotation of the side gear shafts 29 and 29'. The gear casing 32 has opposite axial boss portions respectively journaled in bearings 33 and 33' received in the transaxle casing 6 and has carried therein a pair of differential bevel pinions 34 which are rotatably mounted on a common pinion cross shaft 35 secured to the gear casing 32 and extending at right angles to the axis of rotation of the gear casing 32. The individual bevel pinions 34 are, thus, rotatable not only together with the gear casing 32 and cross shaft 35 about the axis of rotation of the gear casing 32 but also independently of one another about the center axis of the cross shaft 35, viz., an axis perpendicular to the axis of rotation of the gear casing 32. The differential bevel pinions 34 intervene between and are held in mesh with a pair of differential side bevel gears 36 and 36' which are also carried in the differential gear casing 32 and which are rotatable about the axis of rotation of the gear casing 32. The side bevel gears 36 and 36' are fixedly connected to or splined to axially inner end portions of the side gear shafts 29 and 29', respectively, extending into the gear casing 33 in a lateral direction of the vehicle body. One side gear shaft 29 extends outwardly from the gear casing 32 and in part through the hollow shaft 27 and an axial bore in the intermediate drive gear 25. The other side gear shaft 29' extends outwardly from the gear casing 32 in the opposite direction to the side gear shaft 29. The side gear shafts 29 and 29' form part of front axle assemblies and are operatively connected at their axially outer ends to front wheel drive shafts (not shown), respectively. The front wheel drive shafts also extend in a lateral direction of the vehicle body and are connected at their outer axial ends to the front wheel axles for front road wheels, respectively, via suitable coupling means such as universal joints, though not shown in the drawing. The gear casing 32 of the differential gear assembly 31 as above described has one of its axial boss portions formed with a hollow axial extension 32a directed toward the hollow shaft 27 axially extending from the intermediate drive gear 25 as shown.

The front-wheel drive gear unit 4 further comprises power splitting gear means operative to split driving power from the intermediate drive gear 25 into two driving power components one of which is to be transmitted to the differential gear assembly 31 and the other of which is to be transmitted to the rear-wheel drive gear unit 5. In the embodiment of a transaxle mechanism according to the present invention, such power splitting gear means is also operative to provide driving connection from the intermediate drive gear 25 to the gear casing 32 of the above described differential gear assembly 31 selectively at two different speeds. The power splitting gear means provided in the front-wheel drive gear unit 4 is thus constituted by a low-and-high speed shift gear assembly 37 which comprises a driving member 38 having an externally serrated annular portion 38a and a hollow axial extension 38b. The serrated annular portion 38a coaxially surrounds an axial portion of the side gear shaft 29 and is located axially adjacent the externally serrated axial boss portion of the differential gear casing 32. The hollow axial extension 38b extends axially from the annular portion 38a in coaxial relationship to the side gear shaft 29 and has an externally serrated leading end portion axially splined to the previously mentioned serrated inner peripheral portion 27a of the hollow shaft 27. The driving member 38 is thus rotatable with the intermediate drive gear 25 about the axis of rotation of the side gear shaft 29 and has its axial extension 38b journaled in a bearing 39 received in the transaxle casing 6 as shown. The low-and-high speed shift gear assembly 37 further comprises first and second spur gears 40 and 41 disposed also in coaxial relationship to the side gear shaft 29 and in such a manner that the above mentioned annular portion 38a of the driving member 38 axially intervenes between the first and second spur gears 40 and 41. The first spur gear 40 is coaxially rotatable on the the hollow axial extension 38b of the driving member 38 and has an externally serrated annular portion 40a or a clutch gear portion 40a axially adjacent one end face of the annular portion 38a of the driving member 38. On the other hand, the second spur gear 41 has an internally serrated inner peripheral portion splined to the previously mentioned externally serrated axial extension 32a of the differential gear casing 32 and has an externally serrated annular portion 41a or clutch gear portion 41a axially adjacent the other end face of the annular portion 38a of the driving member 38. The externally serrated annular portion 38a of the driving member 38 has splined thereto an internally serrated, annular coupling element 42. The coupling element 42 is axially movable on the externally serrated annular portion 38a of the driving member 38 selectively into engagement with the externally serrated annular portion 40a of the first spur gear 40 or the externally serrated annular portion 41a of the second spur gear 41.

The low-and-high speed shift gear assembly 37 further comprises first and second speed reduction gears coaxially rotatable together on a common reduction gear shaft 43 which is secured at both axial ends thereof to the transaxle casing 6 and which has a center axis parallel with the axis of rotation of the above described driving member 38. In the embodiment herein shown, the first and second transfer gears are commonly constituted by a unitary reduction gear member 44 rotatable on the reduction gear shaft 43 and having first and second gear portions 44a and 44b which are axially spaced apart from each other. These first and second gear portions 44a and 44b of the reduction gear member 44 are held in mesh with the first and second spur gears 40 and 41, respectively. In the low-and-high speed shift gear assembly 37 thus constructed and arranged, the first and second spur gears 40 and 41 are assumed to have $N_1$ and $N_2$ numbers of teeth, respectively, while the first and second gear portions 44a and 44b of the reduction gear member 44 are assumed to have $n_1$ and $n_2$ numbers of teeth, respectively. It is, in this instance, further assumed that the number $n_1$ of the teeth of the first gear portion 44a of the reduction gear member 44 is exactly or largely equal to the number $N_1$ of the teeth of the first spur gear 40 and is larger than the number $n_2$ of the teeth of the second gear portion 44b of the reduction gear member 44. Furthermore, the number $N_2$ of the teeth of the second spur gear 41 is larger than the number $n_2$ of the teeth of the second gear portion 44b of the reduction gear member 44.

On the other hand, the rear-wheel drive gear unit 5 comprises a power transfer shaft 45, a two-wheel/four-wheel drive shift gear assembly 46 and a right-angle power transfer gear assembly 47. The power transfer shaft 45 has opposite axial end portions respectively journaled in bearings 48 and 48' received in the transaxle casing 6 and is rotatable about an axis parallel with the above described reduction gear shaft 43. The right-angle power transfer gear assembly 47 is operatively connected through a rear wheel driveline to the wheel axles for rear road wheels (not shown), while the two-wheel/four-wheel drive shift gear assembly 46 is adapted to selectively establish or cut off driving connection from the low-and-high speed shift gear assembly 37 to the rear wheel driveline. For this purpose, the two-wheel/four-wheel drive shift gear assembly 46 basically comprises at least three clutch elements consisting of a first clutch element held in driving connection to the rear wheel driveline and rotatable with, for example, the rear-wheel power transfer shaft 45, a second clutch element rotatable with the reduction gear member 44 or more basically with the intermediate drive gear 25 and a third clutch element rotatable with one of the first and second clutch elements and selectively movable into and out of engagement with the other of the first and second clutch elements. In the embodiment herein shown, the first clutch element is constituted by an externally serrated annular clutch member 49 mounted on or splined to an axial end portion of the rear-wheel power transfer shaft 45 and thus coaxially rotatable with the shaft 45. On the other hand, the above mentioned second clutch element is constituted by a clutch gear 50 coaxially rotatable on the power transfer shaft 45 and held in mesh with the first gear portion 44a of the reduction gear member 44. The clutch gear 50 has an externally serrated annular portion 50a located axially adjacent the clutch member 49. The two-wheel/four-wheel drive shift gear assembly 46 further comprises an internally serrated, annular coupling element 51 which is splined to the clutch member 49. The coupling element 51 constitutes the above mentioned third clutch element and is axially movable on the externally serrated annular clutch member 49 selectively into and out of engagement with the externally serrated annular portion 50a of the clutch gear 50.

The right-angle power transfer gear assembly 47 essentially consists of the combination of a driving bevel gear 52 and a driven bevel gear 53. The driving bevel gear 52 is internally serrated and is splined to the externally serrated axial end portion of the rear-wheel power transfer shaft 45 and is thus coaxially rotatable with the power transfer shaft 45. The driven bevel gear 53 is held in mesh with the driving bevel gear 52 and has a rearward axial extension 53a journaled in bearings 54 and 54' received in the transaxle casing 6. The driven bevel gear 53 is rotatable about an axis extending at right angles to the axis of rotation of the driving bevel gear 52, viz., in a fore-and-aft direction of the vehicle body. The axial extension 53a of the driven bevel gear 53 projects rearwardly from the transaxle casing 6 through an opening formed in the extension and is connected at its rear end to a propeller shaft (not shown) extending rearwardly from the driven bevel gear 53 in a fore-and-aft direction of the vehicle body. The propeller shaft forms part of the rear wheel driveline and is connected at its rear end to a rear-wheel final reduction and differential gear assembly (not shown) which is constructed and arranged in such a manner as to produce between the input and output members thereof a gear ratio equal to that achieved in the differential gear assembly 31 of the front-wheel drive gear unit 4. A pair of side gear shafts axially extend in a lateral direction of the vehicle body from the rear-wheel final reduction and differential gear assembly similarly to the side gear shafts 29 and 29' of the front-wheel drive gear unit 4. These side gear shafts are operatively connected at their axially outer ends to rear wheel drive shafts, respectively. The rear wheel drive shafts also extend in a lateral direction of the vehicle body and are connected at their outer axial ends to the rear wheel axles for rear road wheels, respectively, through suitable coupling means.

Description will now be made regarding the operation of the four-wheel drive system including the transaxle mechanism constructed and arranged as hereinbefore described.

When the engine 1 is in operation and the clutch unit 2 is in a coupled condition, the driving power delivered from the output shaft 1a of the engine 1 is transmitted through the clutch unit 2 to the input shaft 7 of the power transmission gear unit 3. If, under these conditions, one of the driven gears 16 to 19 on the transmission output shaft 8 is coupled to the shaft 8 through the associated synchronizer clutch assembly 22 or 23 or the reverse idler gear 21 is held in mesh with the reverse drive gear 15 and the synchronizer clutch assembly 22, the driving power carried to the transmission input shaft 7 is transmitted to the transmission output shaft 8 through the selected pair of gears on the shafts 7 and 8 or through the gears 15 and 21. The transmission output shaft 8 is, as a result, driven for rotation at a speed proportioned in the selected ratio to the rotational speed of the transmission input shaft 7. The rotation of the transmission output shaft 8 is transmitted via the transmission output gear 24 on the shaft 8 to the intermediate drive gear 25 which is held in constant mesh with the transmission output gear 24. The rotation of the intermediate drive gear 25 in turn is carried through the hollow shaft 27 to the driving member 38 of the low-and-high speed shift gear assembly 37 through the splined engagement between the serrated end portion 27a of the hollow shaft 27 and the axial extension 38b of the driving member 38. The annular portion 38a of the driving member 38 and the annular coupling element 42 splined to the annular portion 38a are therefore driven for rotation together about the axis of rotation of the side gear shaft 29.

If, in this instance, the annular coupling element 42 of the low-and-high speed shift gear assembly 37 is held in the axial position engaging the serrated annular portion 40a of the first spur gear 40, the driving member 38 is held in driving engagement with the first spur gear 40 through the coupling element 42. Under these conditions, the driving power transmitted to the driving member 38 via the intermediate drive gear 25 is further transmitted through the coupling element 42 and the first spur gear 40 to the first gear portion 44a and accordingly the second gear portion 44b of the reduction gear member 44, which is thus driven for rotation on the reduction gear shaft 43. The reduction gear member 44 in turn drives the second spur gear 41 for rotation also about the axis of rotation of the side gear shaft 29 by the second gear portion 44a of the gear member 44. As a consequence, the gear casing 32 of the differential gear assembly 31 is driven for rotation about an axis at right angles to the cross shaft 35 through the splined engagement between the second spur gear 41 and the serrated axial extension 32a of the gear casing 32. The revolution speed of the gear casing 32 thus driven through the driving member 38, coupling element 42, first spur gear 40, reduction gear member 44 and second spur gear 41 is dictated by the revolution speed of the driving member 38 and the respective numbers of teeth of the spur gears 40 and 41 and the gear portions 44a and 44b of the reduction gear member 44. In the arrangement of the low-and-high speed shift gear assembly 37 in which the number $N_1$ of the teeth of the first spur gear 40 and the number $n_1$ of the teeth of the first gear portion 44a of the gear member 44 are exactly or largely equal to each other as previously noted, the reduction gear member 44 is driven to rotate at a speed exactly or approximately equal to the revolution speed of the first spur gear 40 and accordingly of the driving member 38. The revolution speed of the gear casing 32 is, thus, dictated by the revolution speed of the driving member 38 and the gear ratio between the second spur gear 41 and the second gear portion 44b of the reduction gear member 44. Since, in this instance, the number $n_2$ of the teeth of the gear portion 44b is smaller than the number $N_2$ of the teeth of the second spur gear 41 as also noted previously, the second spur gear 41 and accordingly the differential gear casing 32 are driven for rotation at a speed proportional to and lower than the reduction gear member 44 and accordingly than the driving member 38 and the intermediate drive gear 25.

If, on the other hand, the annular coupling element 42 of the low-and-high speed shift gear assembly 37 is held in the axial position engaging the annular portion 41a of the second spur gear 41, the driving member 38 is held in driving engagement with the second spur gear 41 through the coupling element 42. Under these conditions, the driving power transmitted to the driving member 38 through the intermediate drive gear 25 is further transmitted through the coupling element 42 and the second spur gear 41 to the gear casing 32 of the differential gear assembly 31. The driving member 38, coupling element 42, second spur gear 41 and gear casing 32 are for this reason driven for rotation as a single unit about the aligned axes of rotation of the side gear shafts 29 and 29'. The gear casing 32 of the differential gear assembly 31 is driven for rotation about an axis at right angles to the cross shaft 35 at a speed equal to the revolution speed of the driving member 38 and accordingly of the intermediate drive gear 25. Driving power is in these manners transmitted from the intermediate drive gear 25 to the gear casing 32 of the differential gear assembly 31 at two different speeds depending upon the axial positions of the coupling element 42 on the annular portion 38a of the driving member 38.

When the low-and-high speed shift gear assembly 37 is in the condition having the annular coupling element 42 held in engagement with the first spur gear 40, the driving power transmitted to the first spur gear 40 is carried not only to the differential gear casing 32 through the first and second gear portions 44a and 44b of the reduction gear member 44 and the second spur gear 41 but to the rear-wheel drive gear unit 5 by way of the first gear portion 44a of the reduction gear member 44. When, on the other hand, the low-and-high speed shift gear assembly 37 is in the condition having the coupling element 42 held in engagement with the second spur gear 41, the driving power transmitted to the second spur gear 41 is carried not only to the differential gear casing 32 via the annular coupling element 42 and the second spur gear 41 but to the rear-wheel drive gear unit 5 by way of the second gear portion 44b and accordingly the first gear portion 44a of the reduction gear member 44. Thus, the reduction gear member 44 and the coupling element 42 of the low-and-high speed shift gear assembly 37 serves not only for the reduction of the revolution speed of the driving power to be transmitted from the driving member 38 to the differential gear casing 32 but as a rear-wheel power transfer member through which the driving power transmitted to the driving member 38 is partly carried to the rear-wheel drive gear unit 5. In the differential gear assembly 31, the gear casing 32 driven for rotation by the second spur gear 41 drives the differential bevel pinions 34 for rotation with the casing 32 about the center axis of the cross shaft 35. The differential bevel pinions 34 in turn drive the differential side bevel gears 36 and 36' for rotation with respect to the gear casing 32 about an axis at right angles to the center axis of the cross shaft 35. Thus, the driving power transmitted to the differential gear assembly 31 of the front-wheel drive gear unit 4 is further split into two output components, which are respectively transmitted to the side gear shafts 29 and 29' and through these shafts and the front-wheel drive shafts to the front road wheels, respectively.

On the other hand, the driving power transmitted either from the first spur gear 40 to the first gear portion 44a of the reduction gear member 44 or from the second spur gear 41 to the second gear portion 44b of the reduction gear member 44 is carried from the first gear portion 44a of the reduction gear member 44 to the clutch gear 50 on the power transfer shaft 45. If, in this instance, the coupling element 51 of the two-wheel/-four-wheel drive shift gear assembly 46 is held in the axial position engaging the serrated annular portion 50a of the clutch gear 50, the driving power imparted from the reduction gear member 44 to the clutch gear 50 as above mentioned is transmitted through the coupling element 51 and the annular clutch member 49 to the rear-wheel power transfer shaft 45 and drives the power transfer shaft 45 for rotation about the center axis thereof. The power transfer shaft 45 thus drives the driving bevel gear 52 of the right-angle power transfer gear assembly 47 for rotation with the power transfer shaft 45, and the driving bevel gear 52 in turn drives the driven bevel gear 53 for rotation about the axis thereof in a fore-and-aft direction of the vehicle body. The driving power transmitted to the driving member 38 is, thus, carried not only to the differential gear assembly 31 but also to the propeller shaft (not shown) through the two-wheel/four-wheel drive shift gear assembly 46 and the driving and driven bevel gears 52 and 53 of the right-angle power transfer gear assembly 47. The driving power transmitted to the propeller shaft is carried to the rear-wheel final reduction and differential gear assembly and is thereby further split into two driving power components respectively driving the rear-wheel drive shafts. These power components drive the drive axles for the rear road wheels for rotation about the respective axes thereof. Thus, both the pair of front road wheels and the pair of rear road wheels are driven for rotation so that the vehicle operates in four-wheel driven conditions. If, however, the coupling element 51 of the two-wheel/four-wheel drive shift gear assembly 46 in the rear-wheel drive gear unit 5 is held in the axial position disengaged from the serrated annular portion 50a of the clutch gear 50, the power transfer shaft 45 is uncoupled from the reduction gear member 44 so that the clutch member 49 and accordingly the power transfer shaft 45 are isolated from the driving power transmitted to the clutch gear 50 and are allowed to idle together with the driving bevel gear 52 on the shaft 45. In this instance, only the front road wheels are driven for rotation so that the vehicle operates in two-wheel driven conditions.

While the power unit in the embodiment of the present invention has been assumed as being positioned in a front portion of the vehicle body, the power unit of a transaxle mechanism according to the present invention may be installed in a lengthwise middle or rear portion of the vehicle body.

One of the outstanding advantages of the transaxle mechanism proposed by the present invention as thus far described is that such a transaxle mechanism can be realized simply by modifying a transaxle mechanism for a two-wheel vehicle drive system in such a manner that the front-wheel drive gear unit of the transaxle mechanism has additionally incorporated therein a low-and-high speed shift gear assembly in combination with the existing differential gear assembly thereof. This will contribute to significant reduction of the production cost of a transaxle mechanism for use in a four-wheel drive system having a low-and-high speed shift feature as well as a two-wheel/four-wheel shift feature.

What is claimed is:

1. A transaxle mechanism of a four-wheel drive system for a vehicle with first and second pairs of road wheels, comprising
   a power unit having an output shaft rotatable about an axis in a lateral direction of the vehicle;
   a power transmission gear unit including transmission input and output shafts each having an axis of rotation parallel with an extension of the axis of rotation of the output shaft of said power unit;
   an intermediate drive gear rotatable about an axis parallel with the respective axes of rotation of the transmission input and output shafts, the transmission output shaft being held in driving engagement with said drive gear;
   a first wheel drive gear unit comprising power splitting gear means operative to split driving power from said drive gear into two power components and a differential gear assembly operative to transmit one of the two power components to the first pair of road wheels;
   a second wheel drive gear unit comprising transfer gear means engageable with said power splitting gear means and operative to transmit therethrough the other of said two driving power components in a fore-and-aft direction of the vehicle;
   said power splitting gear means operatively intervening between said drive gear and said second wheel drive gear unit and constituting low-and-high speed shifting gear means to transfer driving power from the drive gear to the differential gear assembly selectively with two different gear ratios; and
   a driveline intervening between said transfer gear means and said second pair of road wheels and adapted to be driven by the driving power component transmitted through the transfer gear means.

2. A transaxle mechanism as set forth in claim 1, in which said low-and-high speed shifting gear means comprising a first gear rotatable independently of said intermediate drive gear, a second gear drivingly connected to said differential gear assembly, a coupling element rotatable with the intermediate drive gear and movable selectively into engagement with the first and second gears, a first reduction gear held in mesh with said first gear and in drivable engagement with said second wheel drive gear unit and a second reduction gear rotatable with said first reduction gear and held in mesh with said second gear.

3. A transaxle mechanism as set forth in claim 2, in which said first and second gears are rotatable about axes commonly aligned with the axis of rotation of said intermediate drive gear and in which said coupling element is axially movable selectively into engagement with the first and second gears in a direction parallel with said axes.

4. A transaxle mechanism as set forth in claim 3, in which said first and second reduction gears are rotatable together about axes aligned with each other and parallel with the axes of rotation of said first and second gears.

5. A transaxle mechanism as set forth in claim 2, 3 or 4, in which said second gear is larger in number of teeth than said second reduction gear.

6. A transaxle mechanism as set forth in any one of claims 1 to 4, in which said transfer gear means comprises a driving bevel gear rotatable about an axis in a lateral direction of the vehicle, and a driven gear rotatable about an axis in a fore-and-aft direction of the vehicle and held in mesh with said driving bevel gear.

7. A transaxle mechanism as set forth in claim 6, in which said second wheel drive gear unit further comprises two-wheel/four-wheel shift gear means intervening between said power splitting gear means and said driveline and operative to selectively establish and cut off driving connection from the power splitting gear means to the driveline through said transfer gear means.

8. A transaxle mechanism as set forth in claim 2, 3 or 4, in which said transfer gear means comprises a driving bevel gear rotatable about an axis parallel with the axes of rotation of said reduction gears and a driven bevel gear rotatable about an axis in a fore-and-aft direction of the vehicle and held in mesh with said driving bevel gear, the second wheel drive gear unit further comprising two-wheel/four-wheel shift gear means which comprises a first clutch element rotatable with the driving bevel gear, a second clutch element held in mesh with one of said first and second reduction gears, and a third clutch element movable on one of the first and second clutch elements selectively into and out of engagement with the other of the first and second clutch elements.

* * * * *